Jan. 12, 1932. H. E. MEYER 1,840,676
OIL PUMP
Filed July 3, 1929
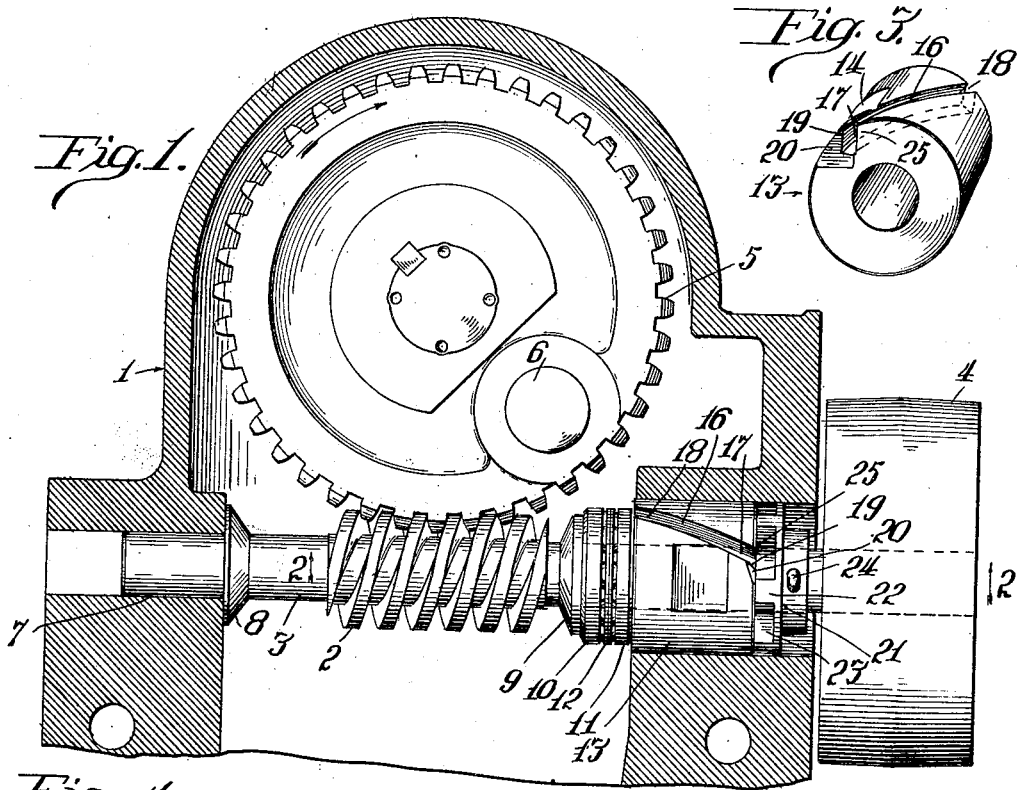
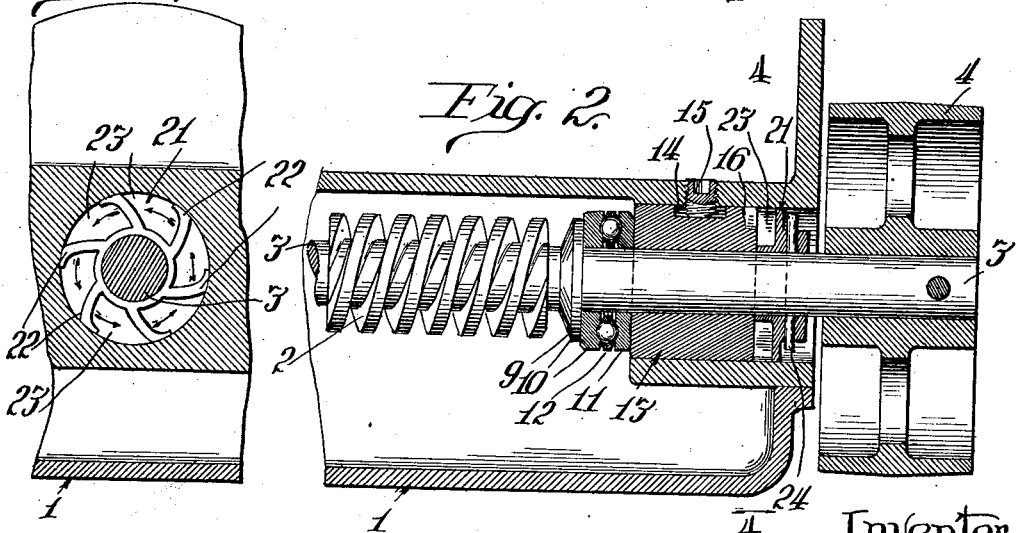
Inventor
HARVEY E. MEYER
By Barnett & Jinman
Attorneys Patented Jan. 12, 1932

1,840,676

UNITED STATES PATENT OFFICE

HARVEY E. MEYER, OF KANSAS CITY, MISSOURI, ASSIGNOR TO VULCAN MANUFACTURING COMPANY, OF KANSAS CITY, MISSOURI, A CORPORATION OF MISSOURI

OIL PUMP

Application filed July 3, 1929. Serial No. 375,815.

This invention relates to a mechanism for preventing the leakage of lubricants from any sealed container through which a movable shaft is operated, by returning to the inside of said sealed container the lubricant that finds its way out through the journal bearing. The primary object of the invention is to provide a simple mechanism which operates automatically to prevent leakage of oil or the like through a journal bearing by forcing such oil as tends to leak out, to return to its proper reservoir. More particularly I refer to a certain type of washing machine having its gears and connecting rod enclosed in a sealed gear case which is filled with lubricant and which is operated by a worm drive also enclosed in said gear case, said worm gear being part of a shaft extending through said gear case to the power supply. Heretofore great difficulty has existed in preventing the oil from said gear case from leaking through the bearing where said shaft extends through the gear case.

My invention obviates this difficulty in a simple and automatic manner by providing a rotary pump, driven by the shaft, for returning the lubricant to the reservoir.

Numerous other objects and advantages of this invention will be apparent from the following detailed description of one approved form of apparatus embodying the principles of this invention.

In the accompanying drawings:

Fig. 1 is a sectional plan view.

Fig. 2 is a vertical section taken substantially on the line 2—2 of Fig. 1.

Fig. 3 is a detail perspective view of the cylindrical bushing described further below.

Fig. 4 is a vertical cross section taken substantially along the line 4—4 of Fig. 2.

Referring now more particularly to the drawings wherein like and corresponding parts are designated by similar reference characters throughout, 1 indicates the wall of the casing, in which is enclosed a worm 2 mounted on a shaft 3, which extends through said casing, as clearly shown in Figs. 1 and 2, and on which is mounted on the outside of said casing a pulley 4. A worm gear 5 is shown meshed with the worm 2 and is caused to rotate thereby in the direction shown by the arrows whenever power is applied to the pulley 4 and which worm gear 5 in turn operates the connecting rod (not shown) one end of which is attached to the trunnion 6. One end of the shaft 3 is journaled in the socket bearing 7 in the casing 1 and has a shoulder 8 which prevents lateral movement in one direction. The other end of shaft 3 extends through said casing 1, as above described. It is on this end of the shaft that the invention described herein is located. A shoulder 9 is permanently attached to the shaft 3. 10 and 11 are washers formed with roller bearing raceways and fitted loosely over the shaft 3, between which washers is located the ball thrust bearing cage 12. The shaft 3 beyond the thrust bearing is journaled in a cylindrical shaped bushing 13 having a key 14 in which engages a screw plug or other key 15 mounted in the casing 1 by which the bushing is securely fastened to the casing 1, as shown in Figs. 1 and 2. The bushing 13 is formed with a slot or lubricant passage 16 extending diagonally inward and downward through one side of the bushing from the outer end 17 to the inner end 18 thereof. The outer end portion 17 of the slot is of greater depth than the inner end portion 18. The outer corner 19 is cut away or beveled as indicated at 20. Next adjacent the bushing 13 is a rotor or impeller 21, as best shown in Fig. 4, having a plurality of curved blades 22 forming pockets 23 and which is fastened securely to the shaft 3 by means of a cotter pin 24, as clearly shown in Fig. 2.

In operation, the casing 1 is filled with lubricant and then sealed so as to prevent escape or leakage of any of said lubricant. However, the bearing formed by the passage of the shaft 3 through the bushing 13 is not lubricant-tight inasmuch as the shaft must rotate through said bushing. Hence the lubricant tends to leak through this joint. As it does so, it comes into contact with the rotor 21 which is rotating with the shaft 3 in a direction indicated by the arrows. The leaking lubricant is thereupon forced into the pockets 23 and centrifugal force causes the lubricant to rise toward the outer ends of the blades 22. As each of the blades 22 passes by the open outer end of slot 16 of the bushing 13, the edge 25 of the slot 16 wipes the excessive oil from the blade and directs it into the slot 16. Inasmuch as the outer end 17 of the slot 16 is higher than the inner end 18 due to the diagonal position of the slot in the cylindrical bushing 13, the lubricant wiped off by the edge 25 is caused to flow in the slot 16 toward the end 18 and thence back into the inside of the casing 1. Because the end 18 is of less depth than the end 17, the returning lubricant is discharged over the washer 11 and back inside the casing 1 instead of being forced between the washer 11 and the bushing 13 as would be the case were the end 18 of the slot 16 of equal depth with the outer end 17. Also the movement of the gear inside said casing causes the lubricant filling said casing to surge about and in passing the inner end 17 of the slot 14, creates a partial vacuum in said slot and tends to draw any lubricant that is in the slot into the casing.

I claim:

1. In combination with a casing containing lubricant, a rotary shaft extending through one wall of said casing and a fixed bushing mounted in the wall in which said shaft is journaled, said bushing having a slot formed in its outer cylindrical surface and inclined downwardly from its outer to its inner end and means mounted on the outer portion of the shaft and rotatable therewith for collecting lubricant that has leaked through the bearing surface and for forcing the lubricant through said passage into the casing.

2. In combination with a casing containing lubricant, a rotary shaft extending through one wall of said casing and a fixed bushing mounted in the wall in which said shaft is journaled said bushing having a diagonal slot in its outer cylindrical surface inclined downwardly from its outer to its inner end, said outer end being of greater depth than the inner end and means mounted on the outer portion of the shaft and rotatable therewith for collecting and forcing the lubricant through said passage.

3. In combination with a casing containing lubricant, a rotary shaft extending through one wall of said casing and a stationary bushing mounted in the wall in which said shaft is journaled, said bushing having a diagonal slot in its outer cylindrical surface inclined downwardly from its outer to its inner end, said outer end being of greater depth than the inner end and a rotary pump mounted on the outer portion of the shaft and rotatable therewith for collecting lubricant that has leaked through the bearing surface and for forcing the lubricant into said passage which leads to the interior of the casing.

4. In combination with a casing containing lubricant, a rotary shaft extending through one wall of said casing, and a bushing fixedly mounted in the wall in which said shaft is journaled, said bushing having a lubricant return passage extending downwardly to the inner end of said bushing and spaced apart from the bearing surface, a wiping edge located on the outer end of said passage, and a rotary pump mounted on the outer portion of the shaft and operated thereby adjacent the outer end of said bushing adapted to direct lubricants escaping through the bearing surface to said wiping edge and into said return passage.

5. In combination with a casing containing lubricant, a rotary shaft extending through one wall of said casing, a bushing fixedly mounted in the wall in which said shaft is journaled, said bushing having a lubricant return passage extending downwardly to the inner end of said bushing, and spaced apart from the bearing surface, and a rotary pump mounted on the outer portion of the shaft and operated thereby, adjacent the outer end of said bushing adapted to direct lubricant escaping through the bearing surface into said return passage.

HARVEY E. MEYER.